(12) United States Patent
Swei et al.

(10) Patent No.: US 7,901,778 B2
(45) Date of Patent: Mar. 8, 2011

(54) WEATHERABLE MULTILAYER FILM

(75) Inventors: Gwo Swei, Vandalia, OH (US); Viktor Skatchkov, Bloomingdale, NJ (US); Kevin G. Hetzler, Sparta, NJ (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 474 days.

(21) Appl. No.: 11/332,497

(22) Filed: Jan. 13, 2006

(65) Prior Publication Data

US 2007/0166562 A1    Jul. 19, 2007

(51) Int. Cl.
*B32B 27/32* (2006.01)
*B32B 27/00* (2006.01)

(52) U.S. Cl. ......... 428/421; 428/212; 428/515; 428/520; 428/522

(58) Field of Classification Search ............... 428/423.1, 428/423.7, 480, 424.2, 483, 500, 501, 515, 428/421, 220, 422; 359/887, 890; 430/270.1
See application file for complete search history.

(56) References Cited

U.S. PATENT DOCUMENTS

| | | | |
|---|---|---|---|
| 3,253,060 A | 5/1966 | Koblitz et al. |
| 4,317,860 A | 3/1982 | Strassel |
| 4,677,017 A | 6/1987 | DeAntonis et al. |
| 4,743,327 A | 5/1988 | DeHaan et al. |
| 4,859,379 A | 8/1989 | Chiang |
| 4,871,506 A | 10/1989 | Moulies et al. |
| 4,879,345 A | 11/1989 | Connelly et al. |
| 5,143,761 A | 9/1992 | Chiotis et al. |
| 5,242,976 A | 9/1993 | Strassel et al. |
| 5,256,472 A | 10/1993 | Moriya et al. |
| 5,284,710 A | 2/1994 | Hartley et al. |
| 5,322,899 A | 6/1994 | Grunewalder et al. |
| 5,395,471 A | 3/1995 | Obijeski et al. |
| 5,589,028 A | 12/1996 | Robinson et al. |
| 5,756,230 A | 5/1998 | Gao et al. |
| 6,114,441 A | 9/2000 | Spohn et al. |
| 6,117,508 A | 9/2000 | Parsonage et al. |
| 6,127,478 A | 10/2000 | Spohn |
| 6,136,437 A | 10/2000 | Reither |
| 6,143,415 A | 11/2000 | Lorek et al. |
| 6,284,335 B1 | 9/2001 | Spohn |

(Continued)

FOREIGN PATENT DOCUMENTS

WO    00/04848 A    2/2000

(Continued)

OTHER PUBLICATIONS

C. Pattamaprom, et al., "Analysis of Extensional Viscosity Techniques for the Characterization of Fluorpopolymers", ANTEC 2002.

(Continued)

*Primary Examiner* — Cynthia H Kelly
*Assistant Examiner* — Chanceity N Robinson
(74) *Attorney, Agent, or Firm* — Larson Newman & Abel LLP; Chi S. Kim

(57) ABSTRACT

A multilayer polymer film includes first and second polymer layers. The first polymer layer includes a first ultraviolet radiation absorber. The second polymer layer overlies the first polymer layer and includes a second ultraviolet radiation absorber. The first ultraviolet radiation absorber has a peak absorbtivity wavelength less than 300 nm and the second ultraviolet radiation absorber has a peak absorbtivity wavelength greater than 300 nm.

20 Claims, 4 Drawing Sheets

U.S. PATENT DOCUMENTS

| | | |
|---|---|---|
| 6,306,503 B1 | 10/2001 | Tsai |
| 6,352,764 B1* | 3/2002 | Andrus et al. ................ 428/327 |
| 6,436,495 B1 | 8/2002 | Tsukamoto et al. |
| 6,436,533 B1 | 8/2002 | Heffner et al. |
| 6,440,548 B1* | 8/2002 | Bourdelais et al. ........ 428/304.4 |
| 6,444,311 B1* | 9/2002 | Friedman et al. ............. 428/354 |
| 6,482,522 B1 | 11/2002 | Parsonage et al. |
| 6,524,671 B1 | 2/2003 | Spohn |
| 6,524,686 B2 | 2/2003 | Strassel |
| 6,576,342 B1 | 6/2003 | Cerf et al. |
| 6,583,222 B1 | 6/2003 | Chaudbary et al. |
| 6,593,005 B2 | 7/2003 | Tau et al. |
| 6,630,047 B2 | 10/2003 | Jing et al. |
| 6,635,714 B1 | 10/2003 | Wood et al. |
| 6,667,101 B2 | 12/2003 | Silagy et al. |
| 6,685,793 B2 | 2/2004 | Jing |
| 6,699,798 B2 | 3/2004 | Rockford |
| 6,706,351 B2 | 3/2004 | Abusleme et al. |
| 6,743,865 B2 | 6/2004 | Mekhilef et al. |
| 6,753,087 B2 | 6/2004 | Jing et al. |
| 6,759,129 B2 | 7/2004 | Fukushi |
| 6,767,948 B1 | 7/2004 | Jing |
| 6,773,104 B2* | 8/2004 | Cornelius et al. ............. 347/106 |
| 6,780,935 B2 | 8/2004 | Hedhli et al. |
| 6,790,912 B2 | 9/2004 | Blong |
| 6,797,781 B2 | 9/2004 | Lee et al. |
| 6,811,859 B2 | 11/2004 | Bonnet et al. |
| 6,833,043 B1 | 12/2004 | Parsonage et al. |
| 6,838,520 B2 | 1/2005 | Etherton |
| 6,849,314 B2 | 2/2005 | Jing et al. |
| 6,855,787 B2 | 2/2005 | Funaki et al. |
| 6,863,954 B2* | 3/2005 | Peiffer et al. ................. 428/141 |
| 2001/0051256 A1 | 12/2001 | Silagy et al. |
| 2002/0061398 A1 | 5/2002 | Heffner et al. |
| 2002/0068175 A1 | 6/2002 | Strassel |
| 2002/0074691 A1 | 6/2002 | Mortellite et al. |
| 2002/0136851 A1* | 9/2002 | Kollaja et al. ................ 428/40.1 |
| 2002/0150763 A1* | 10/2002 | Silagy et al. ................. 428/421 |
| 2003/0008144 A1* | 1/2003 | Whitney et al. ............... 428/402 |
| 2003/0035971 A1 | 2/2003 | Bussi et al. |
| 2003/0041952 A1 | 3/2003 | Mortellite et al. |
| 2003/0080326 A1* | 5/2003 | Schunk et al. ................ 252/589 |
| 2003/0104219 A1 | 6/2003 | Hare et al. |
| 2003/0108754 A1* | 6/2003 | Murschall et al. ............ 428/480 |
| 2003/0114595 A1 | 6/2003 | Van Dun et al. |
| 2003/0145938 A1 | 8/2003 | Mortellite et al. |
| 2003/0198769 A1 | 10/2003 | Jing et al. |
| 2004/0023037 A1 | 2/2004 | Baumert et al. |
| 2004/0054050 A1 | 3/2004 | Pascal et al. |
| 2004/0086721 A1 | 5/2004 | Bonnet et al. |
| 2004/0121079 A1* | 6/2004 | Urscheler et al. ............. 427/420 |
| 2004/0137252 A1 | 7/2004 | Bonnet et al. |
| 2005/0271867 A1* | 12/2005 | Hetzler et al. ................ 428/212 |
| 2006/0032739 A1* | 2/2006 | Ikeda et al. ............. 204/192.23 |
| 2006/0057392 A1* | 3/2006 | Smillie et al. ................ 428/421 |
| 2006/0272766 A1* | 12/2006 | Hebrink et al. .......... 156/244.11 |

FOREIGN PATENT DOCUMENTS

| | | |
|---|---|---|
| WO | 00/55656 A | 9/2000 |

OTHER PUBLICATIONS

M.H. Wagner, "Rheotens-Mastercurves and Drawability of Polymer Melts", Polymer Engineering and Science, mid-Apr. 1996, vol. 36, No. 7., pp. 925-935.

J.S. Lee, et al., "Meltspinning Dynamic of Phan-Thien Tanner Fluids", Korea-Australia Rheology Journal, Jun. 2000, vol. 12, No. 2, pp. 119-124.

T. Matsumoto, et al., "Draw Resonance Involving Rheological Transitions", Polymer Engineering and Science, May 1978, vol. 18, No. 7, pp. 564-571.

J.C. Hyun, "Theory of Draw Resonance", Aiche Journal, May 1978, vol. 24, No. 3, pp. 418-422.

J.C. Hyun, "Part II. Power Law and Maxwell Fluids", Aiche Journal, May 1978, vol. 24, No. 3, pp. 423-426.

S. Goyal, "The Influence of Polymer Structure on Melt Strength Behavior of PE Resins", Plastics Engineering, Feb. 1995, pp. 25-28.

E. M. Phillips, et al., "High Performance Polypropylene Extrusion Coating Resins", Journal of Coated Fabrics, vol. 19, Jan. 1990, pp. 155-168.

K.K. Dohrer, et al., "Resistance to Draw Resonance of Linear Low Density Polyethylene Through Improved Resin Design", ANTEC '89, May 1-3, pp. 177-183, 1989.

P.J. Lucchesi, et al., "Reducing Draw Resonance in LLDPE Film Resins", Plastics Engineering, May 1985, pp. 87-90.

A. Ghijsels, et al., "Draw Resonance Studies on Polypropylene Melts", International Congress on Rheology, 8th, 1980, Ed. by G. Astarita, pp. 15-24.

J. Flanagan, "Better die Design and Equipment Enhance the Cast Film Process", Modern Plastics International, Feb. 1993, pp. 35-37.

E.H. Roberts, et al., "Draw Resonance Reduction in Melt Embossing and Extrusion Coating Resins", Advances in Polymer Technology, vol. 6, No. 1, pp. 65-71 (1986).

H. Kometani, et al., "Development of Wide and High-Speed Nonoriented Film Production Lines", Mitsubishi Heavy Industries, Ltd., Technical Review, vol. 38, No. 1, Feb. 2001.

* cited by examiner

WEATHERABLE MULTILAYER FILM

FIELD OF THE DISCLOSURE

This disclosure in general relates to weatherable multilayer polymer films.

BACKGROUND

Increasingly manufacturers are turning to polymers to create surfaces that are resistant to chemical and environmental damage. For example, fluorinated polymers exhibit resistance to damage caused by exposure to chemicals, such as methylethylketone (MEK), resistance to stains, and resistance to damage caused by exposure to environmental conditions. Such polymers have been used in applications, such as airplane and train cargo hold liners, vinyl siding surface treatments, and photovoltaic protective coverings.

For outdoor applications, manufacturers seek to provide weatherable films and, in particular, films that protect underlying surfaces from ultraviolet radiation damage. In addition, the films themselves are desirably resistant to damage caused by ultraviolet radiation. Polymer films using acrylic polymers are especially susceptible to damage caused by ultraviolet radiation. Particular acrylic polymers may leach from the film, undergo free radical damage, or cross-link when exposed to ultraviolet radiation, leading to a change in the physical properties of the polymer film.

As a result, manufacturers add an ultraviolet radiation (UV) absorber to a layer of the polymer film. However, high concentrations of ultraviolet radiation absorber typically result in decreased mechanical performance of the polymer film and haze within the polymer film. In addition, previous authors have noted a leaching of UV absorber from the polymer film leading to decreased performance over time. As a result, the lifetime of the polymer film may be limited and underlying substrates or components may be damaged as the protective film degrades. As such, an improved weatherable polymer film would be desirable.

SUMMARY

In a particular embodiment, a multilayer polymer film includes first and second polymer layers. The first polymer layer includes a first ultraviolet radiation absorber. The second polymer layer overlies the first polymer layer and includes a second ultraviolet radiation absorber. The first ultraviolet radiation absorber has a peak absorbtivity wavelength less than 300 nm and the second ultraviolet radiation absorber has a peak absorbtivity wavelength greater than 300 nm.

In another exemplary embodiment, a multilayer polymeric film includes first and second polymer layers. The first polymer layer includes fluoropolymer. The second polymer layer overlies the first polymer layer and includes fluoropolymer, acrylic polymer, and at least two ultraviolet radiation absorbers.

In a further exemplary embodiment, a multilayer polymer film includes first and second polymer layers. The first polymer layer includes fluoropolymer. The second polymer layer includes acrylic polymer and at least two ultraviolet radiation absorbers. The multilayer polymer film has an absorbance of at least about 4.0 for electromagnetic radiation having a wavelength of about 250 nm and an absorbance of at least about 4.0 for electromagnetic radiation having a wavelength of about 315 nm.

In an additional embodiment, a multilayer polymer film includes a first polymer layer including polyvinylidene fluoride. The multilayer polymer film has a haze not greater than 7.0% and has an absorbance at least about 3.5 for electromagnetic radiation having wavelengths between 200 nm and 350 nm.

In a further exemplary embodiment, a multilayer polymeric film includes first and second polymer layers. The first polymer layer includes a first ultraviolet radiation absorber and has an absorbance at least about 3.0 for electromagnetic radiation having a wavelength of 265 nm. The second polymer layer overlies the first polymer layer. The second layer includes a second ultraviolet radiation absorber and has an absorbance at least about 3.0 for electromagnetic radiation having a wavelength of 315 nm. The multilayer polymeric film has a transmission of at least about 80.0% for radiation having wavelengths 400 nm to 700 nm.

In another exemplary embodiment, a multilayer polymeric film includes first and second polymer layers. The first polymer layer includes a first ultraviolet radiation absorber. The second polymer layer overlies the first polymer layer. The second polymer layer includes a second ultraviolet radiation absorber. The first ultraviolet radiation absorber is different than the second ultraviolet radiation absorber.

In a further exemplary embodiment, a multilayer polymeric film includes a layer formed of a blend of fluoropolymer and acrylic. The multilayer polymeric film has a transmission of at least about 80.0% for radiation having wavelengths 400 nm to 700 nm and exhibits a delta E not greater than 20.0 for a red square after 800 hours of exposure to ultraviolet radiation in accordance with ASTM 2244.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

In a particular embodiment, a multilayer polymeric film includes a first layer having a first ultraviolet radiation (UV) absorber component and a second layer having a second UV absorber component. The first and second UV absorber components are different from each other, for example, having a different UV absorbance profile with respect to wavelength. In one exemplary embodiment, the first polymer layer includes at least two ultraviolet radiation absorbers and the second polymer layer includes at least two ultraviolet radiation absorbers. In general, the ultraviolet radiation (UV) absorbers are organic radiation absorbers and are free of non-organic or ceramic materials. In one example, the multilayer polymer film is transparent to visible light while being opaque or semi-opaque to ultraviolet radiation. In general, the multilayer film includes at least two layers. For example, the multilayer film may include two, three, four, five or more layers.

In another exemplary embodiment, a multilayer polymer film includes a first polymer layer including fluoropolymer and a second polymer layer including a blend of fluoropolymer, acrylic polymer and at least two UV radiation absorbers.

The multilayer polymer film may include a third polymer layer including acrylic polymer and at least two UV absorbers. In a particular embodiment, the multilayer film includes an outermost layer, at least one intermediate layer, and an innermost layer. In general, the outermost layer forms a thin protective barrier, the one or more intermediate layers provide mechanical properties and the innermost layer forms an additional protective barrier or forms an adhesive layer for adhering, bonding or contacting with a substrate.

Figure 1:
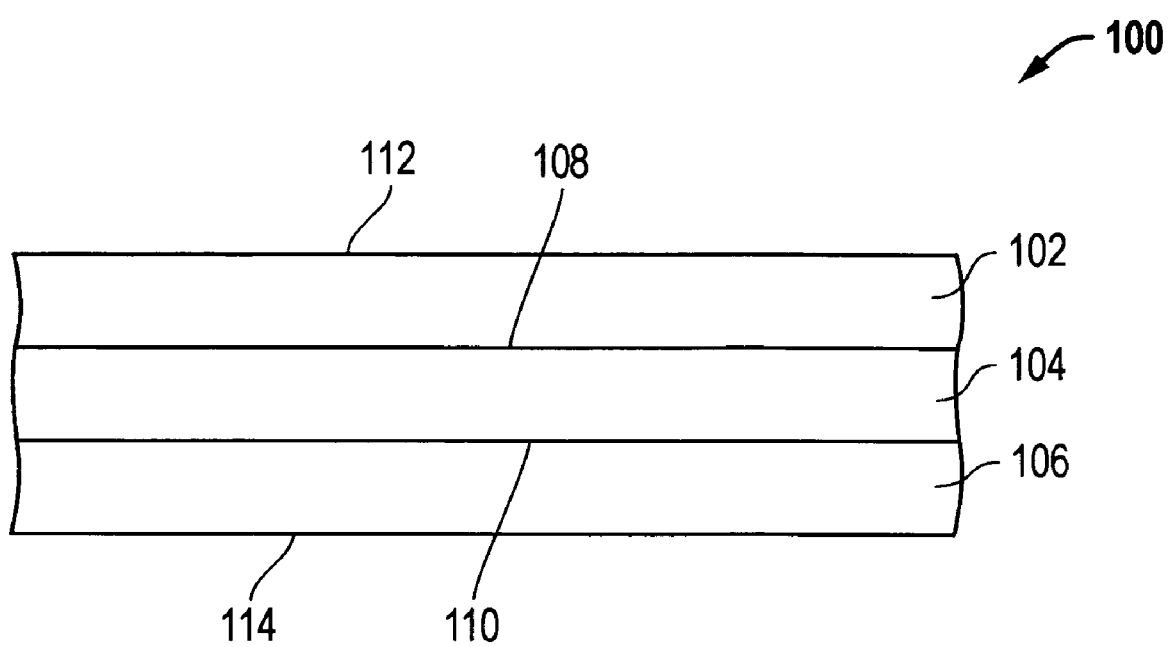
FIG. 1 includes illustrations of an exemplary multilayer polymer film.

For example, FIG. 1 illustrates an exemplary embodiment of a multilayer film 100 having three layers 102, 104 and 106. The multilayer film 100 generally includes an outer surface 112 and an inner surface 114. In an embodiment, the outer surface 112 is exposed to environmental conditions, and the inner surface 114 is configured to bond to a substrate.

In a particular embodiment, the multilayer film 100 includes an outermost layer 102 that forms the outermost surface 112. The outermost layer 102 is bonded directly to a first major surface 108 of an intermediate layer 104. An innermost layer 106 forms the innermost surface 114 and is bonded directly to a second major surface 110 of the intermediate layer 104. For example, layers 102, 104 and 106 may be coextruded to form the multilayer film.

When forming a protective film, the outermost polymer layer 102 typically includes a weather resistant polymer, such as a halogenated polymer, for example, a fluoropolymer. An exemplary fluoropolymer includes a polymer formed from a fluorine substituted olefin monomer or a polymer including at least one monomer selected from the group consisting of vinylidene fluoride, vinylfluoride, tetrafluoroethylene, hexafluoropropylene, trifluoroethylene, chlorotrifluoroethylene, and a mixture of such fluorinated monomers. An exemplary fluoropolymer includes polyvinylidene fluoride (PVDF) or PVDF copolymer, such as vinylidene fluoride/hexafluoropropylene copolymer. An exemplary fluoropolymer may include a polymer, a polymer blend or a copolymer including one or more of the above monomers, such as, for example, fluorinated ethylene propylene (FEP), ethylene-tetrafluoroethylene (ETFE), poly tetrafluoroethylene-perfluoropropylvinylether (PFA), poly tetrafluoroethylene-perfluoromethylvinylether (MFA), poly tetrafluoroethylene (PTFE), poly vinylidene fluoride (PVDF), ethylene chlorotrifluoroethylene (ECTFE), polychlorotrifluoroethylene (PCTFE), or tetrafluoroethylene-hexafluoropropylene-vinylidene fluoride (THV). In a further exemplary embodiment, the fluoropolymer may be a copolymer of an alkene monomer with a fluorinated monomer, such as Daikin™ EFEP by Daikin America, Inc.

Many fluoropolymers are commercially available from suppliers in various grades. For example, suppliers can supply multiple resins having nominally the same composition but different properties, such as different molecular weights to provide specific viscosity characteristics. An exemplary PVDF polymer includes PVDF 1010 or PVDF 21510 by Solvay Solexis. Another example includes Kynar 720, Kynar 740, or Kynar 760 by Atofina. In a further example, an alloy of a PVDF homopolymer and a PVDF copolymer may provide the film with improved elastic modulus and gloss reduction.

In an exemplary embodiment, the outermost polymer layer 102 is formed of about 80% to about 100% by weight fluoropolymer. For example, the outermost polymer layer 102 may be formed of 100% by weight fluoropolymer, such as PVDF, and, in a particular embodiment, consists essentially of fluoropolymer. In a particular embodiment, the outermost polymer layer 102 is free of UV absorber.

The one or more intermediate layers 104 typically include a blend of polymer and UV absorber. In one exemplary embodiment, an intermediate layer 104 includes a polymer compatible with fluoropolymer, such as an acrylic polymer. In another exemplary embodiment, the intermediate layer 104 includes a blend of fluoropolymer and acrylic polymer. The fluoropolymer may be a polymer or a copolymer selected from the fluoropolymers identified above.

The acrylic polymer may be, for example, an acrylic polymer formed from a monomer having an alkyl group having from 1-4 carbon atoms, a glycidyl group or a hydroxyalkyl group having from 1-4 carbon atoms. A representative acrylic polymer includes poly methacrylate, polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate or a mixture thereof.

The acrylic polymer may be, for example, an impact grade or impact modified acrylic. Impact-modified acrylic polymers generally include a copolymer of monomers of acrylic monomers with an effective amount of suitable comonomer or graft moiety to produce the desired elastic modulus and impact resistance. An acrylic elastomer, sometimes referred to as acrylate rubber, polyacrylate rubber, polyacrylic elastomer or "ACM" and which is a composition based on a mixture of a polyacrylate and polymethacrylate, a polyacrylate and ethylene methacrylate copolymer ("EMAC") (such as Chevron Chemicals EMAC 2260), or a polyacrylate and ethylene butylacrylate ("EBAC"), can be used. Alternatively, a thermoplastic impact-modified acrylic polymer can be a blend of a clear glassy acrylic polymer, such as a plastic copolymer of ethylene and a carboxylic acid compound selected from acrylic acid, methacrylic acid and a mixture thereof, with elastomeric components, for example.

In another embodiment, the impact-modified acrylic polymer includes fine particles of elastomer dispersed uniformly in the plastic copolymer. The impact grade acrylic may include transparent toughened thermoplastic blends prepared by blending 10 to 99 weight percent of a block copolymer; 0.1 to 1 weight percent of particulate rubber having a particle size from 0.1 to 10 microns; and the balance a clear glassy polymer. Another suitable technique for making impact-modified acrylic polymer employs the use of a so-called "core/shell" product. These are generally polymer particles that have a central core of one polymer surrounded by a shell of another polymer. The core can be either the plastic or elastomer component and the shell will be the opposite, i.e., elastomer or plastic component.

In a particular embodiment, the acrylic is a linear impact modified acrylic. In a further exemplary embodiment, the acrylic is a branched impact modified acrylic. Generally, an acrylic exemplifying melt strain hardening behavior in the desired draw ratio domain is particularly suitable. In another exemplary embodiment, an acrylic exemplifying higher melt-phase tensile force in the desired draw ratio domain may be suitable.

In an exemplary embodiment, the intermediate layer or layers 104 include a polymer matrix and a UV absorber. In a particular example, the polymer matrix may be formed of a blend of polymers, such as a fluoropolymer and a polymer compatible with the fluoropolymer. For example, the polymer matrix may be formed of a blend of fluoropolymer, such as PVDF, and acrylic polymer. In an exemplary embodiment, the intermediate polymer layer or layers 104 include about 30% to about 80% fluoropolymer by weight and about 20% to about 70% acrylic polymer by weight. For example, the intermediate layer or layers 104 may include about 40 wt % to about 70 wt % fluoropolymer, such as about 50 wt % to about 65 wt %. In another exemplary embodiment, the intermediate layer or layers 104 include about 20 wt % to about 50 wt % acrylic polymer, such as about 20 wt % to about 40 wt % acrylic polymer.

The intermediate layer 104 includes a UV absorber. For example, the intermediate layer 104 may include a low wavelength UV absorber. The intermediate layer 104 may include not greater than about 5.0 wt % UV absorber, such as about 0.1 wt % to about 5.0 wt % UV absorber. In a particular embodiment, the intermediate layer 104 includes at least two UV absorber species. In this embodiment, the intermediate layer 104 may include between 0.1 wt % to about 2.0 wt % of each of the UV absorber species. As such, the intermediate layer 104 includes a cumulative total of about 0.1 wt % to about 5.0 wt % UV absorber.

A UV absorber absorbs electromagnetic radiation having wavelengths below 400 nanometers (nm). Typically, the UV absorber absorbs electromagnetic radiation having wavelengths between 200 nm and 400 nm, such as electromagnetic radiation having wavelengths between 200 nm and 350 nm. Often, a particular species of UV absorber exhibits a peak absorbance at a particular wavelength, termed peak absorbtivity wavelength.

In one exemplary embodiment, the UV absorber is selected from an organic UV absorber class, such as the benzotriazole class, the triazine class, the hindered amine light stabilizer (HALS) class and the oxanilide class. For example, the UV absorber may be a benzotriazole class absorber, such as 2,4-di-tert-butyl-6-(5-chlorobenzotriazol-2-yl) phenol or 2-(2H-benzotriazol-2-yl)-p-cresol. In another example, the UV absorber is of the triazine class, such as 2-(4,6-diphenyl-1,3,5-triazin-2-yl)-5-hexyloxy-phenol. In a further exemplary embodiment, the UV absorber is a HALS UV absorber, such as bis(2,2,6,6,-tetramethyl-4-piperidyl)sebaceate. Other exemplary UV absorbers are available from CIBA Specialty Chemicals, Inc. under the name Tinuvin® or Chemisorb®. In general, the UV absorber is free of non-organic species, such as ceramic species. For example, the UV absorber does not include titanium dioxide or zinc oxide.

Figure 2:
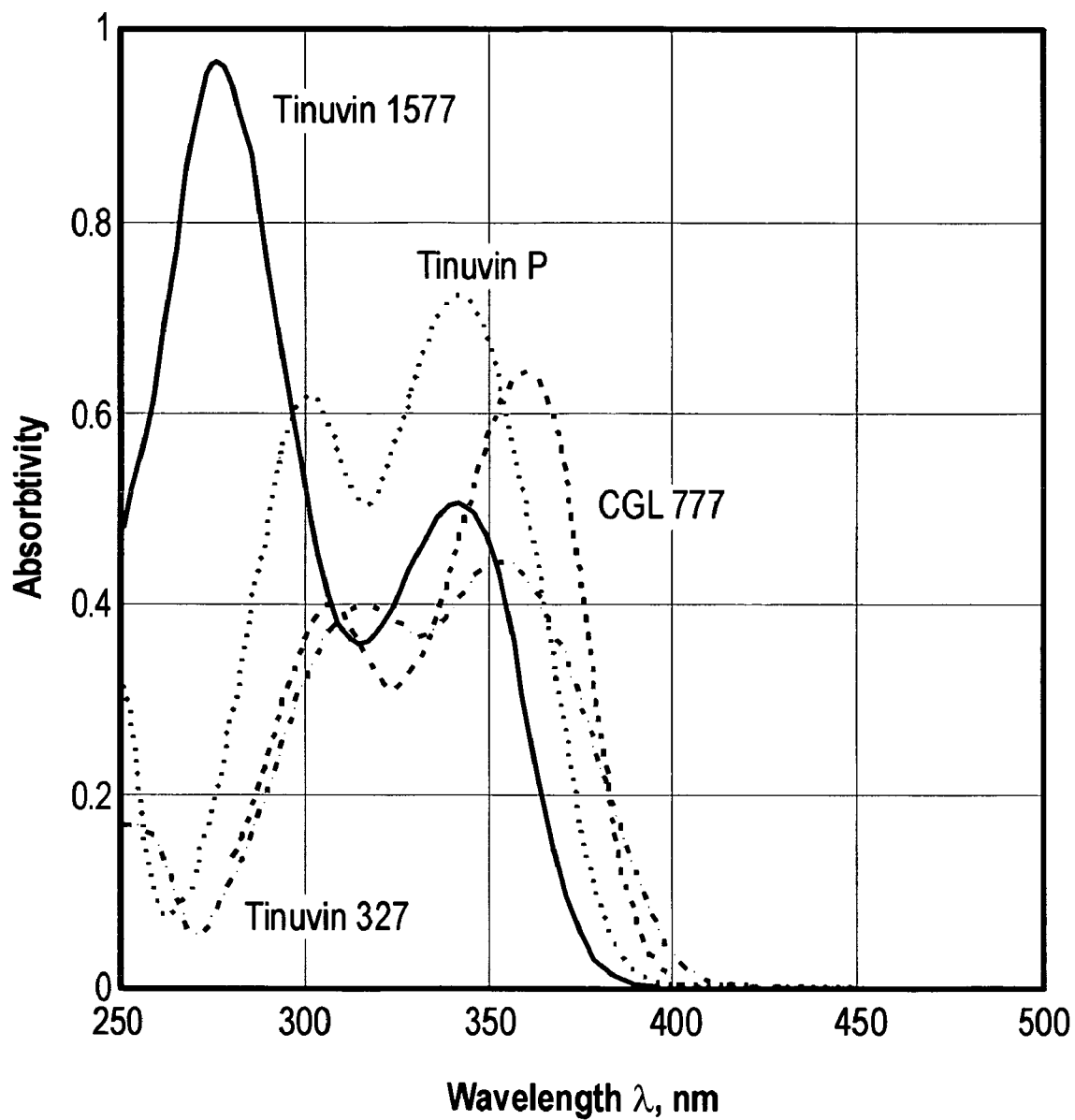
FIG. 2 includes illustrations of absorbtivity profiles of exemplary ultraviolet radiation absorbers.

Particular UV absorbers have low peak absorbtivity wavelengths. For example, a low wavelength UV absorber may have a peak absorbtivity wavelength not greater than about 300 nm, such as not greater than about 285 nm or not greater than about 270 nm. FIG. 2 includes an illustration of the absorbtivity of exemplary UV absorbers. One exemplary low wavelength UV absorber is Tinuvin® 1577, having a peak absorbtivity wavelength at about 275 nanometers.

In contrast, other UV absorbers may have a high peak UV absorbance wavelength. For example, a high wavelength UV absorber may have a peak absorbtivity wavelength at least about 300 nanometers, such as at least about 325 nanometers or at least about 350 nanometers. Particular examples of high wavelength UV absorbers include Tinuvin 327, Tinuvin P, and CGL 777. While each particular UV absorber may have a peak absorbance at a particular wavelength, the UV absorber may absorb radiation at other wavelengths to a lesser extent.

In a particular embodiment, a layer of the multilayer film includes a first UV absorber and a second layer of the multilayer film includes a second UV absorber. For example, the multilayer film may include at least two intermediate layers 104, each including at least one UV absorber. In another example, the multilayer film may include an intermediate layer 104 having a first UV absorber and an innermost layer 106 including a second UV absorber. The first and second UV absorbers are different species and, for example, have different peak absorbtivity wavelengths. In an embodiment, the first UV absorber is a low wavelength UV absorber and the second UV absorber is a high wavelength UV absorber. For example, the first UV absorber may be a low wavelength UV absorber having a peak absorbtivity wavelength not greater than 300 nanometers. The second UV absorber may be a high wavelength UV absorber, having a peak absorbtivity wavelength at least about 300 nanometers.

In a further example, the first and second UV absorber species have peak absorbtivity wavelengths that are different. For example, the difference between the peak absorbtivity wavelength of the first UV absorber and the peak absorbance wavelength of the second UV absorber may be at least about 40 nanometers, such as at least about 60 nanometers or at least about 80 nanometers.

In another exemplary embodiment, at least two UV absorber species may be included within a single layer of the multilayer film. For example, the layer may include at least two low wavelength UV absorbers. In another example, the layer may include at least two high wavelength UV absorbers. In a further example, the layer may include a low wavelength UV absorber and a high wavelength UV absorber. In addition, the layer may include a third or a fourth UV absorber.

In a particular embodiment, one layer of the multilayer film includes a first set of at least two UV absorbers and another layer of the multilayer film includes a second set of at least two UV absorbers. In a further example, the first set of UV absorbers includes a low peak absorbtivity wavelength UV absorber and the second set of UV absorbers includes a high peak absorbtivity wavelength UV absorber.

When used as a secondary protective layer, the innermost layer 106 may have a composition similar to that described above in relation to layer 102. For example, the innermost layer 106 may be formed of 80 wt % to 100 wt % fluoropolymer, and, in a particular embodiment, may consists essentially of fluoropolymer.

However, when used as a compatible layer or an adhesive layer, the innermost layer 106 may include polymers compatible with the intermediate layer 104 and a substrate to which the innermost layer 106 is to be adhered. In an exemplary embodiment, the innermost layer 106 includes a polymer matrix and a UV absorber. The polymer matrix may be formed of a single polymer or a polymer blend. For example, the polymer matrix may be formed of a single acrylic polymer. In another exemplary embodiment, the polymer matrix is formed of a polymer blend, such as a polymer blend including fluoropolymer and acrylic polymer. In a particular example, the innermost polymer layer 106 includes about 30% to about 40% fluoropolymer by weight and about 55% to about 100% acrylic polymer by weight.

When used as a compatible or adhesive layer, the innermost layer 106 may include a UV absorber. In one exemplary embodiment, the UV absorber is a high wavelength UV absorber. In another exemplary embodiment, the innermost layer 106 includes at least two UV absorber species. In an example, the at least two UV absorber species are high wavelength UV absorbers. The innermost layer 106 may include about 0.1% to about 2.0% by weight of each of the UV absorber species. In another exemplary embodiment, the innermost layer 106 includes a cumulative total not greater than about 5.0 wt % UV absorber, such as about 0.1% to about 5.0% UV absorber by weight.

In addition, the multilayer film and the layers thereof may include pigments, fillers, colorants, antioxidants, and plasticizers. In a particular embodiment, the multilayer film 100 is transparent to visible light. For example, the multilayer film 100 may have a transmission of at least about 75.0% for wavelengths of radiation within the visible spectrum, such as wavelengths between 400 and 700 nanometers, for a 1 mil film. In particular, a 1 mil embodiment of the multilayer film 100 may have a transmission of at least about 80.0%, such as at least about 83.0% of a wavelength between 400 nanometers and 700 nanometers. In a particular embodiment, the multilayer film 100 may have a cumulative transmission of at least about 75.0%, such as at least about 80.0% or at least about 83.0% of electromagnetic radiation having wavelengths between 400 nm and 700 nm, for a 1 mil film. In a further embodiment, a 2 mil film may have a transmission of at least about 75.0%.

The multilayer film and layers thereof exhibit low transmission haze for visible light. For example, the multilayer film may have a transmission haze not greater than about 10% for a 1 mil film, such as not greater than about 7%. In another example, the multilayer film may have a haze not greater than about 25% for a 2 mil film.

In an exemplary embodiment, the multilayer film has an elongation at break of at least about 90% in the machine direction. For example, the multilayer film may have an elongation at break of at least about 100%, such as at least about 125% or at least about 150%. In another example, the multilayer film has an elongation at break of at least about 250% in the transverse direction, such as at least about 300% or at least about 450%.

For wavelengths of electromagnetic radiation within the UV spectrum, such as for wavelengths of electromagnetic radiation between 200 nm and 350 nm, the multilayer film may have an absorbance of at least about 3.0. For example, the multilayer film may have an absorbance of at least about 3.5, such as at least about 4.0 or at least about 5.0, for particular wavelengths of electromagnetic radiation between 200 nm and 350 nm. In addition, the multilayer film may have a cumulative absorbance of at least about 3.5, such as at least about 4.0, for wavelengths of electromagnetic radiation between 200 nm and 350 nm. In an exemplary embodiment, individual layers of the multilayer film may have absorbance of at least about 3.0, such as at least about 3.5 or at least about 4.0, for electromagnetic radiation having a wavelength of about 265 nm. In another exemplary embodiment, individual layers of the multilayer film may have absorbance of at least about 3.0, such as at least about 3.5 or at least about 4.0, for electromagnetic radiation having a wavelength of about 300 nm. In a particular embodiment, the multilayer film includes a layer having absorbance of at least about 3.0, such as at least about 3.5 or at least about 4.0, for electromagnetic radiation having a wavelength of about 265 nm and includes a layer having absorbance of at least about 3.0, such as at least about 3.5 or at least about 4.0, for electromagnetic radiation having a wavelength of about 300 nm.

The multilayer film may have thickness at least about 25 microns (1 mil). For example, the multilayer film may have a thickness of about 25 microns (1 mil) to about 105 microns (5 mils), such as about 25 microns to about 55 microns. Particular layers of the multilayer film may form about 5% to about 80% of the multilayer film by volume. Typically, protective layers and adhesive layers, such as the outermost layer 102 or the innermost layer 106, may form about 5% to about 15% of the film. Intermediate layers 104 may form about 50% to about 80% of the multilayer film by volume, such as about 65% to about 75% by volume.

In an exemplary embodiment, the multilayer film includes an outermost protective layer and an innermost adhesive layer. For example, the multilayer film may have an AC-B-AC configuration or an AC-B-CD configuration, wherein each letter (A, B, C, and D) represents a composition forming a layer. In one exemplary embodiment, the multilayer film is co-extruded with unique extruders dedicated to each labeled composition A, B, C or D. For example, each letter (A, B, C, and D) may represent a composition extruded from a particular extruder into a die that coextrudes the combined layers into a film having the stated configuration.

In a particular embodiment, composition A is formed of 100% fluoropolymer, such as about 100% PVDF. For example, composition A may be formed of a PVDF, such as Kynar 740. Cumulatively, the layers including composition A form about 5-10% by volume of the multilayer film. In general, the composition A is free of UV absorber.

Composition B may be, for example, formed of a polymer blend, such as a fluoropolymer/acrylic blend. In an exemplary embodiment, composition B is formed of a blend of about 30 wt % to about 80 wt % PVDF with the remainder acrylic. For example, the blend may include about 60 wt % PVDF and about 40 wt % acrylic. Typically, the layer including composition B forms about 80 wt % to about 90% by volume of the multilayer film.

When the multilayer film forms an AC-B-AC configuration, composition C may be formed of a fluoropolymer/acrylic blend including about 55 wt % to about 100 wt % acrylic. For example, composition C may include about 60 wt % to about 70 wt % acrylic and about 30 wt % to about 40 wt % PVDF. Cumulatively, the layers including composition C form about 5 to about 10% by volume of the multilayer film.

Alternatively, when a layer including composition D is used, such as in the configuration AC-B-CD, composition C may be formed of about 80 wt % to about 100% acrylic and about 0 wt % to about 20% PVDF. In such a configuration, composition D is generally formed of a PVDF/acrylic blend including about 55 wt % to about 100 wt % acrylic, such as about 60 wt % to about 70 wt % acrylic and about 30 wt % to about 40 wt % PVDF.

In these configurations, the film protective UV absorbers are incorporated into the B and C compositions to stabilize the acrylic. Such UV absorbers typically include low wavelength UV absorbers. Substrate protectant UV absorbers are used in compositions B, C and optionally D to block or absorb actinic radiation that may damage the substrate. In general, such substrate protectant UV absorbers are high wavelength UV absorbers or broad spectrum UV absorbers.

In a particular embodiment, a combination of UV absorbers is included in the compositions B, C and optionally D. For example, composition C may include one or more film protecting UV absorbers, such as at least two UV absorbers. The layer may include 0.5 to about 2.0 wt % of each of the UV absorber species, such as 1.0 wt % to about 5.0 wt % total UV absorber. A particular exemplary combination includes Tinuvin® P and Tinuvin® 770. Another exemplary combination includes Tinuvin® 1577 and Tinuvin® 770. A third exemplary combination includes Tinuvin® 400 and Tinuvin® 292. Tinuvin® UV absorbers are available from CIBA Specialty Chemicals, Inc.

Other layers may include a combination of UV absorbers for UV protection. Such UV absorbers may be a blend of high and low UV absorbers to provide a broad spectrum UV absorption. A particular example includes a combination of Tinuvin 1577 and Tinuvin 327, a combination including Tinuvin P, Tinuvin 1577 and Tinuvin 327 or a combination including Tinuvin 1577, CGL 777 and Tinuvin P.

In another exemplary embodiment, the film may form the structure AC-B-CA where each letter represents a different composition from a unique extruder. In this exemplary embodiment, composition A includes a fluoropolymer such as about 100% fluoropolymer and layers including composition A form about 5 to about 10% by volume of the multilayer film. Composition B includes a polymer blend including a fluoropolymer and acrylic. In a particular embodiment, composition B includes about 30 wt % to about 80 wt % PVDF with the remainder of the blend including acrylic. The layer including composition B forms about 80% to about 90% by volume of the multilayer film. Composition C includes a fluoropolymer/acrylic blend including about 70 wt % to about 100 wt % acrylic. The layers including composition C forms about 5% to about 10% of the multilayer film. In a particular embodiment, composition C includes a film protecting blend of UV absorbers and composition B includes a substrate protecting blend of UV absorbers.

In a further exemplary embodiment, the multilayer polymer film may have an A/C/B/C/A configuration. Composition A may be formed of 100% by weight of a first fluoropolymer, such as Solef 1010 PVDF, and layers including composition A may form about 5% to about 15% of the multilayer film by volume. Composition C may be formed of 100% by weight of a second fluoropolymer, such as Kynar 740, and layers including composition C may form about 2.5% to about 7.5% of the multilayer film by volume. Composition B may be formed of about 30% to about 35% by weight of the first fluoropolymer, about 30% to about 35% by weight of the second fluoropolymer, about 30% to about 35% by weight impact modified acrylic, such as Atofina DR101, and about 2.0% to about 5.0% by weight UV absorbers. For example, composition B may include about 1.0 wt % to about 2.5 wt % of a first UV absorber, such as Tinuvin 1577, and about 1.0 wt % to about 2.5 wt % of a second UV absorber, such as Tinuvin 360. The layer including composition B may form about 65% to about 75% of the multilayer polymer film by volume.

Particular embodiments of the above described multilayer films advantageously exhibit low haze values and high transmissions in the visible spectrum. It has surprisingly been found that a blend of at least two UV absorbent species in a single layer permits higher total loading of UV absorber in that particular layer without introducing cloudiness or haze than use of a single UV absorber with the same total loading. As a result, additional protection against UV damage may be provided by films including at least two UV absorbers. Further, exemplary embodiments of film layers including at least two UV absorbers experience better mechanical properties, such as elongation at break, tear resistance, and lower UV absorber migration to film surfaces than film layers formed with a single UV absorber in a similar total amount.

In addition it has been surprisingly noted that use of different UV absorbers in different layers provides broad spectrum UV absorption while maintaining high transmission and low haze in the visible spectrum. For example, particular embodiments of the above described films have transmission haze values not greater than about 7.0%. Such films may also exhibit transmission in the visible spectrum of at least about 80.0%.

Particular embodiments of the above-described multilayer films advantageously reduce color fading in underlying substrates when compared to a currently available product under identical testing conditions. For example, embodiments of the multilayer film may reduce color fading by at least about 25%, such as at least about 50%, after 800 hours of exposure to ultraviolet radiation when compared to products, such as products sold under the trademark Tedlar®. Indeed, embodiments of the multilayer film exhibit a lower delta E than Tedlar® films under identical testing conditions. Delta E may be determined, for example, using a method described in ASTM D2244-93. For example, the delta E of such embodiments may be not greater than about 75%, such as not greater than 50%, of the delta E of Tedlar® films after 800 hours of exposure to ultraviolet radiation. Under identical testing conditions, the delta E of a blue underlying substrate when protected by an embodiment of the multilayer film may be not greater than 5.0 after 800 hours of exposure, while the delta E of a blue underlying substrate when protected by a Tedlar® film may be at least about 8.0 after 800 hours of exposure. In another example, under identical testing conditions, the delta E of a red underlying substrate when protected by an embodiment of the multilayer film may be not greater than 20.0 after 800 hours of exposure, while the delta E of a red underlying substrate when protected by a Tedlar® film may be at least about 27.0 and may be greater than 35.0 after 800 hours of exposure.

In another exemplary embodiment, the multilayer film including a single layer having at least two UV absorbing species may provide comparable absorbance to a layer including a single UV absorbing species while maintaining mechanical properties. For example, a multilayer polymer film including at least two UV absorbers may exhibit at least about 5% improved elongation, such as at least about 10% improved elongation, than a multilayer film of similar composition that includes a single UV absorber in an amount equal to the total amount of the at least two UV absorbers.

EXAMPLE 1

A multilayer film is prepared having the configuration of A/C/B/C/A, wherein each of the labels A, B, and C represents a composition. Composition A is formed of 100 wt % PVDF Solef 1010 and composition C is formed of 100 wt % PVDF Kynar 740. Composition B is formed of 32 wt % PVDF Kynar 740, 32 wt % PVDF Solef 1010, 32 wt % Acrylic DR101, 2 wt % UV absorber Tinuvin 1577, and 2 wt % UV absorber Tinuvin 360. Each layer including composition A forms about 10% by volume of the film, each layer including composition C forms about 5% by volume of the film, and the layer including composition B forms about 70% by volume of the film.

The multilayer film is formed through coextrusion. Each of the compositions A, B, and C are extruded from an associated extruder having a temperature profile of 180° C. to 230° C. The die temperature is 220° C. and the casting drum temperature is 80° C. The line speed is 30 ft/min.

Figure 3:
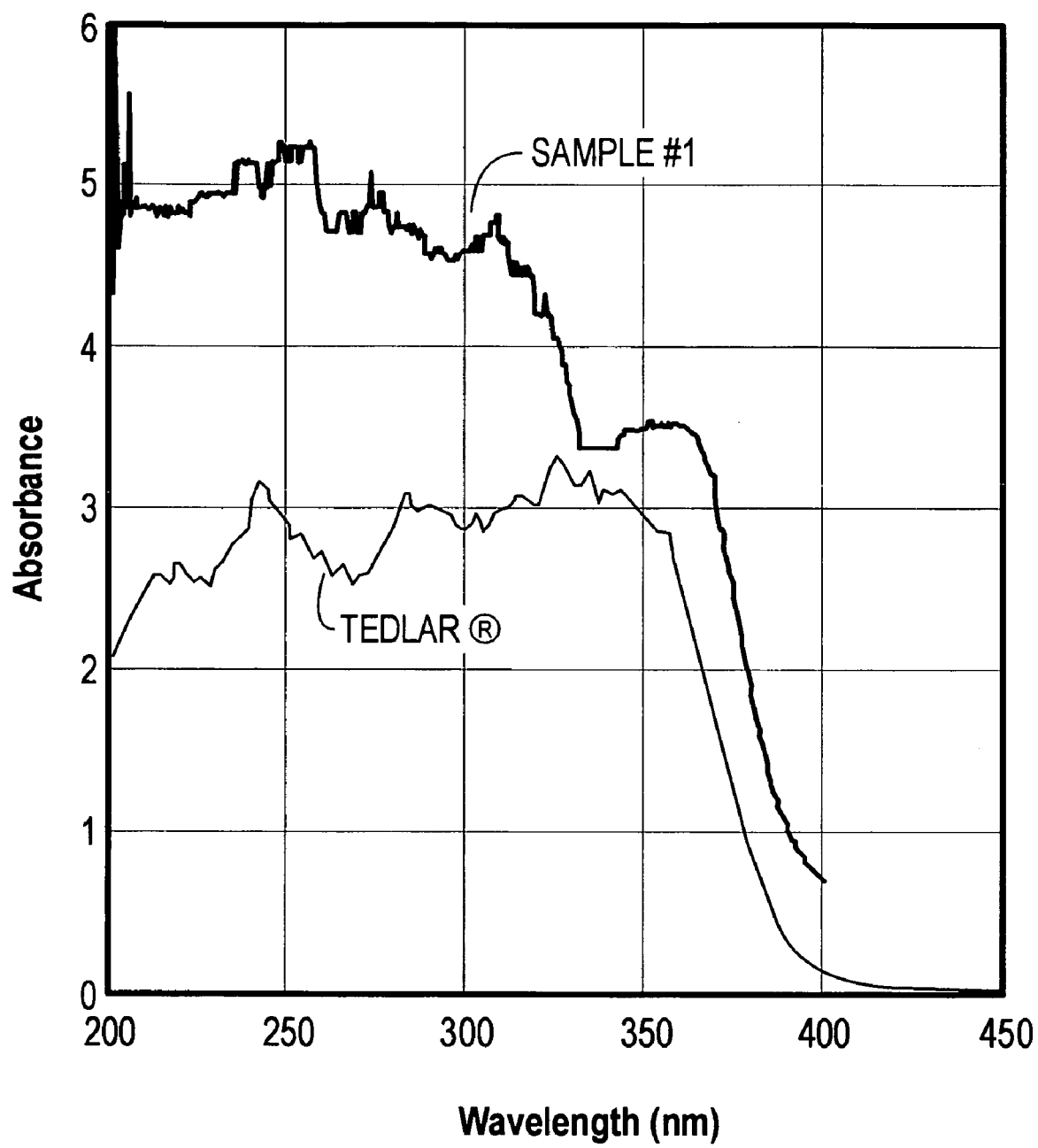
FIGS. 3 and 4 include illustrations of exemplary absorbance patterns of multilayer polymer films.

FIG. 3 includes an illustration of electromagnetic radiation absorbance in the ultraviolet spectrum for a 50.8 micron (2 mil) film formed as described above. The exemplary film is contrasted with a DuPont® Tedlar® film. The multilayer film has a cumulative absorbance greater than 4.0, for wavelengths of 200 nm to 350 nm. For wavelengths within the ultraviolet spectrum, the absorbance is greater than 3.0 and as high as 6.0. For example, the absorbance is greater than 5.0 for electromagnetic radiation having wavelength of 250 nm, at least about 4.5 for electromagnetic radiation of 265 nm, and at least about 4.0 for electromagnetic radiation of 315 nm.

Figure 4:
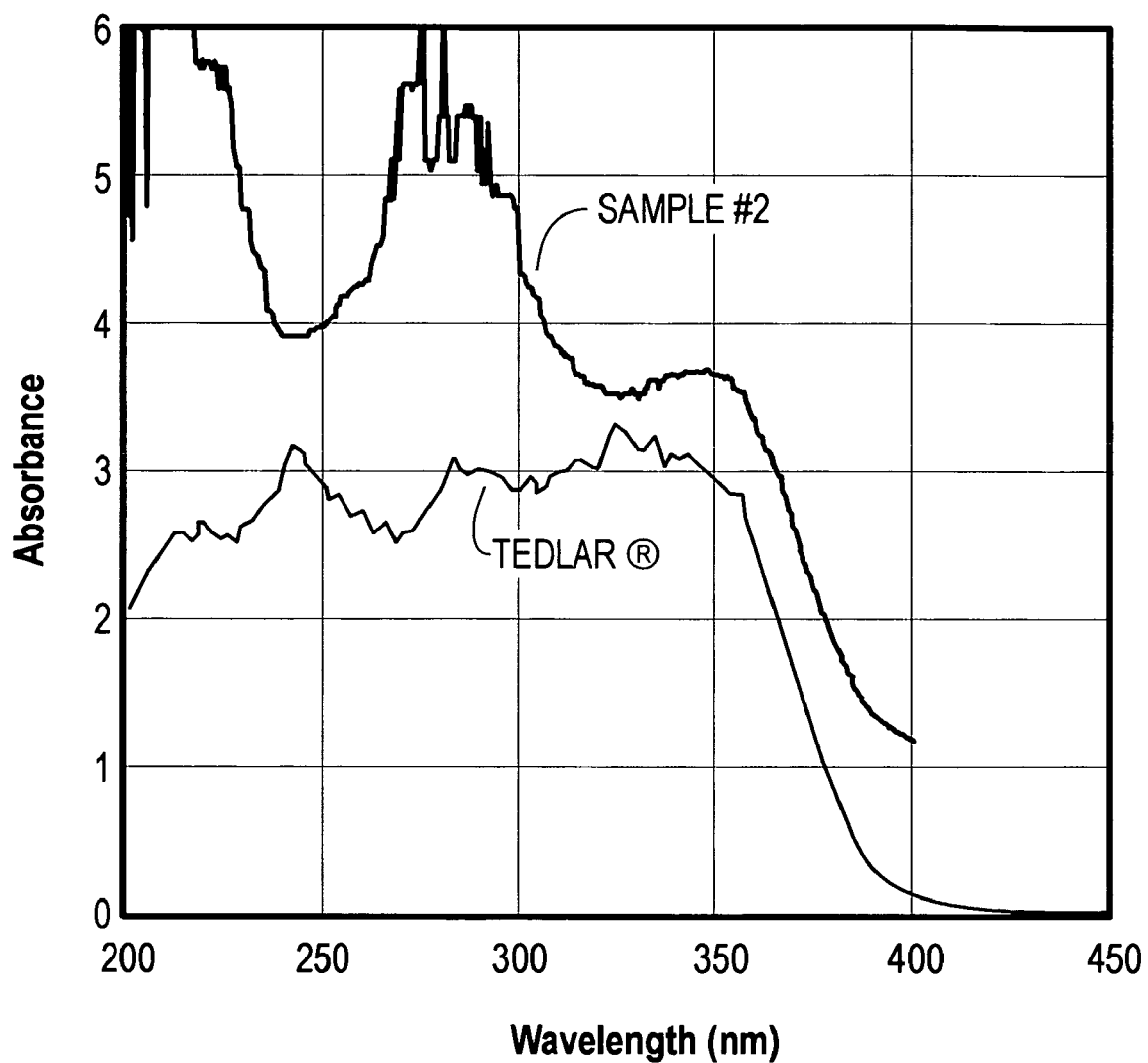

FIG. 4 includes an illustration of electromagnetic radiation absorbance in the ultraviolet spectrum for a 29.2 micron (1.15 mil) film. In contrast to the Dupont® Tedlar® film, this particular exemplary embodiment exhibits high absorbance at the lower end of the ultraviolet spectrum and also high absorbance at the high end of the ultraviolet spectrum. The multilayer film has a cumulative absorbance greater than 4.0, for wavelengths of 200 nm to 350 nm. For wavelengths within the ultraviolet spectrum, the absorbance is greater than 3.0 and as high as 6.0. For example, the absorbance is greater than 3.5 for electromagnetic radiation having wavelength of 250 nm, at least about 4.0 for electromagnetic radiation of 265 nm, and at least about 3.5 for electromagnetic radiation of 315 nm. In addition, the absorbance of the film is at least about 5.0 for electromagnetic radiation of wavelengths 215 nm and 275 nm.

EXAMPLE 2

Films are prepared that are free of UV absorber or that use a combination of three UV absorbers (2% Tinuvin 1577, 2% Tinuvin 360, and 1% Tinuvin 770). The example films include a first layer having 100% PVDF, a second layer including approximately 40% or 70% PVDF (Kynar 740), and a third layer including 75% acrylic (DR101). For films including UV absorber, the UV absorber blend is included in the second layer. The remainder of the second layer is acrylic (DR101). Table 1 illustrates the elongation at break properties of the films in both the machine direction and the transverse direction. As illustrated, the films including UV absorber (UVA) exhibit elongation that in several examples represents an increase in elongation over the films without UV absorber (UVA).

TABLE 1

Elongation Properties of Films

| % PVDF | Films without UVA | | Films with UVA | |
| --- | --- | --- | --- | --- |
| | Machine Direction | Transverse Direction | Machine Direction | Transverse Direction |
| 70 | 115% | 471% | 95% | 509% |
| 40 | 100% | 220% | 160% | 330% |

EXAMPLE 3

Three layer films including UV absorber are evaluated in comparison to commercially available Tedlar® films. The example films include a first layer having 100% PVDF, a second layer including approximately 40% or 70% PVDF, and a third layer including 75% acrylic (DR101). The second layer includes acrylic (DR101) and a blend of UV absorbers as described above in relation to EXAMPLE 2.

Evaluation of the films is conducted according ASTM D 2244-93 "Standard test method for calculation of color differences from instrumentally measured color coordinates". Color blocks with 6 color squares (white, black, red, green and blue) are laminated with the sample films and are subjected to a weathering test using a Xenon Arc chamber. Color characteristics of each sample (in terms of L*, a* and b* parameters) are measured every 400 hours of irradiation using Color Guide 45/0 BYK Gardner unit. Change in color (Delta E) is calculated using ASTM D 2244. Table 2 illustrates changes in color for the sample films. Each of the exemplary films (70% PVDF and 40% PVDF) exhibit a smaller change in color as indicated by a lower delta E than the Tedlar® samples, particularly for longer exposure times.

TABLE 2

Weatherability of Sample Films for Red and Blue Squares

| | Delta E | | | | | |
| --- | --- | --- | --- | --- | --- | --- |
| | Blue | | | Red | | |
| | 400 hours | 800 hours | 1200 hours | 400 hours | 800 hours | 1200 hours |
| 70% PVDF | 4.1 | 4.7 | 5.6 | 8.7 | 14.0 | 28.7 |
| 40% PVDF | 2.6 | 3.3 | 4.4 | 8.6 | 11.5 | 28.7 |
| Tedlar ® Sample 1 | 8.4 | 9.2 | 10.6 | 8.7 | 27.5 | 76.8 |
| Tedlar ® Sample 2 | 7.6 | 8.7 | 10.9 | 20.1 | 58.1 | 78.1 |

While the compositions are expressed in percentages, such as weight percentages and volume percentages, it is understood that specification of a percentage of a particular component affects the percentage of other components within a composition and in no way can the cumulative percentage of all components be greater than one hundred percent.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A multilayer polymer film comprising:
 a first layer comprising fluoropolymer and free of ultraviolet radiation absorber;
 a second layer adjacent the first layer and comprising a blend of 30% to 80% by weight fluoropolymer, 20% to 70% by weight acrylic polymer, and 0.1% to 2.0% by weight of a first ultraviolet radiation absorber; and
 a third layer adjacent the second layer and comprising acrylic polymer and 0.1% to 2.0% by weight of a second ultraviolet radiation absorber;
 wherein the multilayer polymer film has an absorbance of at least 3.5 for electromagnetic radiation within the wavelengths 200 nm to 350 nm.

2. The multilayer polymer film of claim 1, wherein the peak absorbtivity wavelength of the first ultraviolet radiation absorber is at least about 40 nm less than the peak absorbtivity wavelength of the second ultraviolet radiation absorber.

3. The multilayer polymer film of claim 1, wherein the first ultraviolet radiation absorber comprises an organic ultraviolet radiation absorber.

4. The multilayer polymer film of claim 3, wherein the second layer is free of non-organic ultraviolet radiation absorbers.

5. The multilayer polymer film of claim 1, wherein the first ultraviolet radiation absorber includes a hindered amine light stabilizer (HALS).

6. The multilayer polymer film of claim 1, wherein the second layer comprises a third ultraviolet radiation absorber.

7. The multilayer polymer film of claim 1 wherein the first ultraviolet radiation absorber has a peak absorbtivity wavelength less than 300 nm and the second ultraviolet radiation absorber has a peak absorbtivity wavelength greater than 300 nm.

8. The multilayer polymer film of claim 1, wherein the multilayer polymer film has a haze not greater than 7.0%.

9. The multilayer polymer film of claim 1, wherein the multilayer polymer film has thickness of about 25 microns to about 105 microns.

10. The multilayer polymer film of claim 1, wherein the multilayer polymer film has an elongation-at-break of at least about 90% in the machine direction.

11. The multilayer polymer film of claim 1, wherein the first ultraviolet radiation absorber is selected from the group consisting of a benzotriazole, a triazine, a hindered amine light stabilizer, and an oxanilide, and wherein the second ultraviolet radiation stabilizer is selected from the group consisting of a benzotriazole, a triazine, a hindered amine light stabilizer, and an oxanilide.

12. The multilayer polymer film of claim 1, wherein the multilayer polymer film has a cumulative transmission of at least 75.0% for radiation having wavelengths of 400 nm to 700 nm.

13. A multilayer polymer film comprising:
- a first layer comprising fluoropolymer and free of ultraviolet radiation absorber;
- a second layer adjacent the first layer and comprising a blend of 30% to 80% by weight fluoropolymer, 20% to 70% by weight acrylic polymer, and 0.1% to 2.0% by weight of a first ultraviolet radiation absorber; and
- a third layer adjacent the second layer and comprising acrylic polymer and 0.1% to 2.0% by weight of a second ultraviolet radiation absorber;
- wherein the multilayer polymer film has an absorbance of at least 3.5 for electromagnetic radiation within the wavelengths 200 nm to 350 nm;
- wherein the peak absorbtivity wavelength of the first ultraviolet radiation absorber is at least about 40 nm less than the peak absorbtivity wavelength of the second ultraviolet radiation absorber;
- wherein the first ultraviolet radiation absorber has a peak absorbtivity wavelength less than 300 nm and the second ultraviolet radiation absorber has a peak absorbtivity wavelength greater than 300 nm.

14. The multilayer polymer film of claim 13, wherein the multilayer polymer film has a cumulative transmission of at least 75.0% for radiation having wavelengths of 400 nm to 700 nm.

15. The multilayer polymer film of claim 13, wherein the first ultraviolet radiation absorber comprises an organic ultraviolet radiation absorber.

16. The multilayer polymer film of claim 15, wherein the second layer is free of non-organic ultraviolet radiation absorbers.

17. The multilayer polymer film of claim 13, wherein the first ultraviolet radiation absorber includes a hindered amine light stabilizer (HALS).

18. The multilayer polymer film of claim 13, wherein the second layer comprises a third ultraviolet radiation absorber.

19. A multilayer polymer film comprising:
- a first layer comprising fluoropolymer and free of ultraviolet radiation absorber;
- a second layer adjacent the first layer and comprising a blend of 30% to 80% by weight fluoropolymer, 20% to 70% by weight acrylic polymer, and 0.1% to 2.0% by weight of a first ultraviolet radiation absorber; and
- a third layer adjacent the second layer and comprising acrylic polymer and 0.1% to 2.0% by weight of a second ultraviolet radiation absorber;
- wherein the multilayer polymer film has an absorbance of at least 3.5 for electromagnetic radiation within the wavelengths 200 nm to 350 nm;
- wherein the first ultraviolet radiation absorber is selected from the group consisting of a benzotriazole, a triazine, a hindered amine light stabilizer, and an oxanilide, and wherein the second ultraviolet radiation stabilizer is selected from the group consisting of a benzotriazole, a triazine, a hindered amine light stabilizer, and an oxanilide;
- wherein the multilayer polymer film has thickness of about 25 microns to about 105 microns.

20. The multilayer polymer film of claim 19, wherein the multilayer polymer film has a cumulative transmission of at least 75.0% for radiation having wavelengths of 400 nm to 700 nm.

* * * * *